Feb. 5, 1957 E. S. TUPPER 2,780,385
BREAD SERVER
Filed March 23, 1954
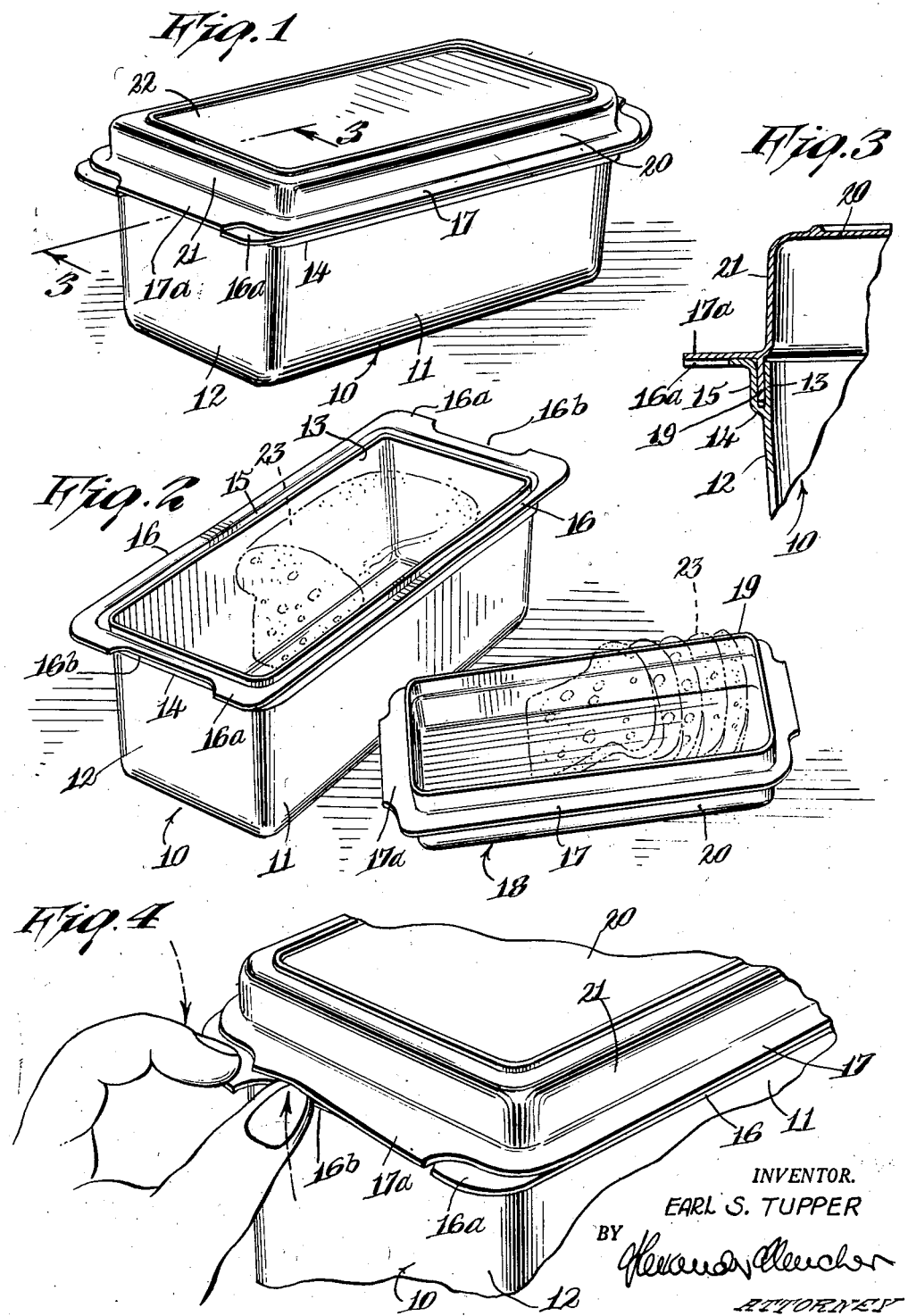
INVENTOR.
EARL S. TUPPER
BY United States Patent Office 2,780,385
Patented Feb. 5, 1957

2,780,385

BREAD SERVER

Earl S. Tupper, Upton, Mass.

Application March 23, 1954, Serial No. 418,070

4 Claims. (Cl. 220—43)

This invention relates generally to nonmetallic receptacles having seal-tight and removable nonmetallic closures, but more specifically to a type of finger operable seal for containers capable of repeated use.

This invention is an improvement over my pending application filed in the U. S. Patent Office on May 8, 1950, under Serial No. 160,765 and which matured into U. S. Patent No. 2,695,645 dated November 30, 1954.

The invention herein provides as an object thereof a substantially fluid and air-tight joint between a receptacle and a removable closure member, the sealing properties and means of removability and applicability of the closure being due to both the specific and cooperating structural elements hereinafter set forth and physical characteristics of the material such as polyethylene, vinyl or other substance having similar properties of elasticity, flexibility, local distortability.

A further object of the invention resides in guiding structure for directing the closure member toward the receiving rim of the receptacle for closure purposes and for removal purposes. Such guiding features make possible operation of the device without fumbling either in applying the closure to the receptacle or when removing the closure from the receptacle.

The invention is further directed to a receptacle and closure therefor to effectuate a fluid and air-tight seal, wherein both parts are made of a material which is inert to, does not absorb and is not readily wettable by water, which does not soften at operating temperatures below the boiling point of water, and which at ordinary temperatures is odorless and resistant to chemicals and solvents.

In addition, as features of the invention, the container and closure present a surface waxy to the touch and also frictional to improve sealability between the closure member and the container member and further provides a sterile medium which is resistant to development of mildews, micro-organisms and insects.

A further feature of the invention resides in the provision of a receptacle and closure therefor of the above characteristics which may be molded or formed by any standard methods and which is economical to manufacture, durable and efficient in operation.

The receptacle and closure member structure has application for storing food such as bread, butter and other types of food and other materials, commercial and domestic, and is further capable of being subjected to refrigeration temperatures for maintaining desirable conditions for the contents.

Other incidental features of the invention will hereinafter appear in the progress of the disclosure and as pointed out in the appended claims.

Accompanying this specification are drawings showing a preferred form of the invention wherein:

Figure 1 is a view in perspective showing a receptacle and closure therefor in assembled position and in sealing relationship.

Figure 2 is a view in perspective of the receptacle and closure in separated position showing the use of the receptacle as a bread storer or server.

Figure 3 is a fragmentary sectional view of Figure 1 along the plane 3—3 thereof.

Figure 4 is an enlarged fragmentary view in perspective showing the closure in the process of separation from the receptacle by the fingers of the hands of the user.

In accordance with the invention in the form as shown, numeral 10 indicates generally the receptacle portion of a container and closure, and consists of a conventional lower wall and a continuous lateral wall. The lateral wall as shown is comprised of a pair of side walls each indicated by numeral 11, and a pair of end walls each indicated by numeral 12. It is of course understood that the lateral wall may be circular, square or of any other polygonal shape.

From the external side of the receptacle 10, there is formed a continuous groove defined by the outer surface of the rim wall portion 13 serving as an inner wall, an outer wall 14 and a connecting base wall 15.

Groove outer wall 14 from the upper edge thereof has an outwardly directed and horizontally disposed flange 16 along the longitudinal edges, said flange 16 continuing along the lateral edges in wider portions as indicated by 16a, each of the lateral wider portions 16a, intermediate the ends thereof being provided with a finger cut-out 16b whereby the width of the flange below the base of such cut-out portion is the same as the width of flange 16 along the longitudinal edges. Flange 16—16a is adapted to serve as a support for a peripheral and horizontally directed flange 17 extending from above the lower edge of the closure member, the latter being generally indicated by numeral 18.

Flange 17 along the longitudinal edges is substantially of the same width as flange 16, but along the lateral edges thereof and continuously are provided extending and wider portions 17a intermediate the ends to serve as handle members, and being adapted to overlie the cut-out parts 16b of the lateral edges 16a of flange 17.

The air- and fluid-tight engagement between cover member 18 and receptacle 12 takes place between the cover rim or wall portion 19 which is below the inner edge of flange 17 and the receptacle groove defined by wall 13, 14 and 15. Rim 19 and flange 17 form the lower portion of cover member 18 and are continuous with the cover, side and end walls 20 and 21, the cover top wall being indicated by numeral 22.

The peripheral configuration of the rim 19 conforms to the peripheral configuration of the receptacle groove defined by walls 13, 14 and 15, and when said rim engages the said receptacle groove, sealing engagement takes place between the outside of rim 19 and the inside of groove wall 14, and between the bottom edge of the rim and the inside of the base wall 15 of the groove. The sealing engagement hereinabove described presupposes that the outside face of rim 19 normally overlaps the inside of groove wall 14 regardless of the relative position of groove wall 13 with respect to the rim.

The resiliency of both the rim 19 and groove wall 14 creates a live and hermetical sealing. Where the groove width between walls 13 and 14 is slightly smaller than the thickness of rim 19, and the latter is centrally positioned with respect to the groove, then sealing contact takes place between the inside of groove walls 13, 14 and 15 and both sides of the rim. If desirable, the groove walls 13 and 14 are under-cut or have an inward slope as shown in the drawings to facilitate sealing contact between the rim walls and the groove walls. Because of the elasticity and local distortability of rim 19 and of the groove walls, substantial conformation with the shape of the groove as defined by walls 13, 14 and 15 will take place.

Receptacle 10 may function for any desired purpose, but as shown is a bread server and storer having slices of bread resting therein as indicated by numeral 23. However, the receptacle and cover above described may serve not only as an open server for other food products but also as a hermetically sealed container for other types of food products.

By virtue of the physical characteristics such as afforded by polyethylene and from which receptacle 10 and cover 18 are made, affixation of the cover 22 to the receptacle is effected by forcing the enlarged flange ends 16a of the cover above the cut-out portions 17b of extending flange 17a whereby cover wall rim 19 is forced into the groove walls 13 and 14. The said cut-out portions serves as a guide for placement of the flange ends 16a. Thereafter, the longitudinal flange walls of the closure member is forced into the longitudinal groove elements by a progressive hand pressing operation. For removal purposes, the cover 18 is lifted from the receptacle or from the groove thereof as by applying the forefinger and thumb of the hands to the flange members 17a and 16a in any order but as shown in Figure 4, the thumb passing through the cut-outs 16b.

Receptacle 10 and the closure 18 therefor have been described as being made of a plastic having a slow rate of recovery, and being responsible for the manner of application by hand pressure and progressive hand pressing operation and the manner of removal by finger separation. However, this invention further contemplates a receptacle and cover therefor made of any material such as glass, composition, metal and other materials having, however, a cover rim 19 with a flange 17—17a and a groove with walls 13, 14 and 15 and a flange 16—16a all made of polyethylene or of any other non-metallic substance having similar physical properties.

Furthermore the invention embraces a cover receptacle made of any other rigid material wherein only the groove walls and flange 13, 14, 15 and 16—16a respectively are made of a locally distortable and resilient material such as polyethylene or other substance having similar characteristics. In this connection, rim 19 and flange 17—17a are rigid and may form part of a rigid cover.

The receptacle and cover herein may be used in the packaging of alcoholic liquids, carbonated beverages, fruits, preserves, milk and derivative products, cheese, candies, other foods and beverages vacuum packed or otherwise, and also for drugs, proprietary preparations, tobacco products etc.

I wish it understood that minor changes and variations in the material, shape, integration and position of parts of the closure and the cooperating receptacle may all be resorted to without departing from the spirit of the invention and the scope of the appended claims.

I claim:

1. In an open mouth container and a removable closure therefor formed of plastic material, a peripheral side wall rim and an outwardly directed stop flange for said closure disposed above the bottom edge of said rim, hermetical sealing and receiving means on said container for said rim comprising an inner, an outer and a base wall to form a rim receiving peripheral groove on the container upper edge, an outwardly directed receiving flange extending from the upper edge of said outer wall of the said groove to abuttingly receive said stop flange when the closure and container are in engagement, a finger-engageable stop flange extension projecting beyond the receiving flange and a cooperating finger-engageable receiving flange extension disposed adjacent thereto when the closure and container are in engagement to facilitate lifting of the closure from the container.

2. In an open mouth container and a removable closure therefor at least one of said members being of a locally deformable and flexible plastic material, a peripheral side wall rim and an outwardly directed stop flange for said closure disposed above the bottom edge of said rim, hermetical sealing and receiving means on said container for said rim comprising an inner, an outer and a base wall to form a rim receiving peripheral groove on the container upper edge, an outwardly directed receiving flange extending from the upper edge of said outer wall of the said groove to abuttingly receive said stop flange when the closure and container are in engagement, a finger-engageable stop flange extension projecting beyond the receiving flange and a pair of cooperating finger-engageable and spaced receiving flange extensions disposed beyond each end portion of said stop flange extension when the closure and container are in engagement to facilitate lifting of the closure from the container and also to guide positioning of the closure over the container for engagement purposes.

3. In an open mouth container and a removable closure therefor formed of plastic material, a peripheral side wall rim and an outwardly directed stop flange for said closure disposed above the bottom edge of said rim, hermetical sealing and receiving means on said container for said rim comprising an inner, an outer and a base wall to form a rim receiving peripheral groove on the container upper edge, an outwardly directed receiving flange extending from the upper edge of said outer wall of the said groove to abuttingly receive said stop flange when the closure and container are in engagement, a pair of opposite finger-engageable stop flange extensions projecting beyond the receiving flange and corresponding cooperating finger-engageable receiving flange extensions disposed beyond each end portion of said stop flanges when the closure and container are in engagement to facilitate lifting of the closure from the container and also to guide positioning of the closure over the container for engagement purposes.

4. In an open mouth container and a removable closure therefor as set forth in claim 3 wherein at least either the container or closure is formed of a locally deformable end flexible plastic material.

References Cited in the file of this patent

UNITED STATES PATENTS

| | | |
|---|---|---|
| 749,231 | Shannon | Jan. 12, 1904 |
| 2,606,586 | Hill | Aug. 12, 1952 |
| 2,695,645 | Tupper | Nov. 30, 1954 |

FOREIGN PATENTS

| | | |
|---|---|---|
| 4,742 | Great Britain | of 1912 |
| 633,989 | France | Oct. 31, 1927 |